(12) United States Patent
Amithrigala et al.

(10) Patent No.: US 10,182,463 B1
(45) Date of Patent: Jan. 15, 2019

(54) TRANSMITTING DATA AMONG MOBILE DEVICES

(71) Applicant: Microsoft Technology Licensing, LLC, Redmond, WA (US)

(72) Inventors: Chamila Amithrigala, Nolensville, TN (US); Jacek Suliga, Sunnyvale, CA (US); Xin Sun, Milpitas, CA (US); Rachel Kumar, San Jose, CA (US); Steven Brooks, Pleasanton, CA (US); Mark Hull, San Jose, CA (US); Hariharan Gopalakrishnan, Madison, WI (US); Haider Sabri, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 15/084,384

(22) Filed: Mar. 29, 2016

Related U.S. Application Data (63) Continuation of application No. 15/063,280, filed on Mar. 7, 2016, now abandoned.

(51) Int. Cl.
*H04W 76/15* (2018.01)
*H04W 12/06* (2009.01)
*H04W 4/80* (2018.01)

(52) U.S. Cl.
CPC ............. *H04W 76/15* (2018.02); *H04W 4/80* (2018.02); *H04W 12/06* (2013.01)

(58) Field of Classification Search
CPC ... H04W 4/008; H04W 8/005; H04W 76/023; H04W 84/12; H04W 84/18; H04W 12/06; H04W 76/02; H04W 48/16; H04W 4/206; H04W 76/021

See application file for complete search history.

(56) References Cited

U.S. PATENT DOCUMENTS

| | | | | |
|---|---|---|---|---|
| 2014/0370879 | A1* | 12/2014 | Redding | H04W 4/001 455/419 |
| 2016/0105788 | A1* | 4/2016 | Helms | H04W 8/005 455/41.2 |
| 2016/0150465 | A1* | 5/2016 | Jung | H04W 48/16 370/254 |
| 2017/0215030 | A1* | 7/2017 | Choi | H04W 4/008 |
| 2017/0279808 | A1* | 9/2017 | Kwon | H04L 63/10 |

\* cited by examiner

*Primary Examiner* — Jung H Park
(74) *Attorney, Agent, or Firm* — Hickman Palermo Becker Bingham LLP; Daniel D. Ledesma (57) ABSTRACT

Techniques are provided for sharing data among computing devices. In one technique, a first device broadcasts wireless data and establishes a wireless connection with a second device. The first device receives authorization data and first entity data from the second device. The first device authorizes the second device based on the authorization data. The first device then sends second entity data through the wireless connection to the second computing device. The first device sends the first entity data over a network to a remote server system. The first device receives, from the remote server system, entity data that pertains to an entity that is identified by the first entity data. The first device may then display at least a portion of the entity data on a screen of the first device.

20 Claims, 4 Drawing Sheets

TRANSMITTING DATA AMONG MOBILE DEVICES

CROSS-REFERENCE TO RELATED APPLICATIONS; BENEFIT CLAIM

This application claims the benefit as a Continuation of application Ser. No. 15/063,280, filed Mar. 7, 2016 the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application.

TECHNICAL FIELD

The present disclosure relates to data processing and, more particularly, to transmitting data efficiently between mobile devices

BACKGROUND

Mobile devices, such as laptops, tablets, and smartphones, are ubiquitous. Mobile devices typically communicate with each other over the Internet or over a cellular network. Recent technologies, such as Bluetooth and Wi-Fi Direct, allow mobile devices to wirelessly connect directly with each other and share data, such as streaming audio, video files, and data processing files. However, such technologies are relatively unstable, which can make transferring large amounts of data using a single wireless connection somewhat difficult.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system are provided for transmitting data between mobile devices. In one technique, a first mobile device establishes a wireless connection directly with one or more other mobile devices and receives particular data from those other mobile devices. Later, the first mobile device establishes a wireless connection directly with a second mobile device and sends the particular data to the second mobile device. The first mobile device may also send data about a user of the first mobile device to the second mobile device. In this way, the second mobile device receives data from other mobile devices without having to establish any wireless connections from the other mobile devices.

In another technique, a first mobile device establishes a wireless connection with a second mobile device that may include a different type of operating system than an operating system included in the first mobile device. Establishment of the wireless connection does not require any input from a user. A small amount of data about certain entities is exchanged. The first mobile device uses first data received from the second mobile device to retrieve, from a remote server over a different (e.g., Internet) connection, information about an entity identified in the first data. Similarly, the second mobile device uses second data received from the first mobile device to retrieve, from the remote server, information about an entity identified in the second data.

System Overview

Figure 1:
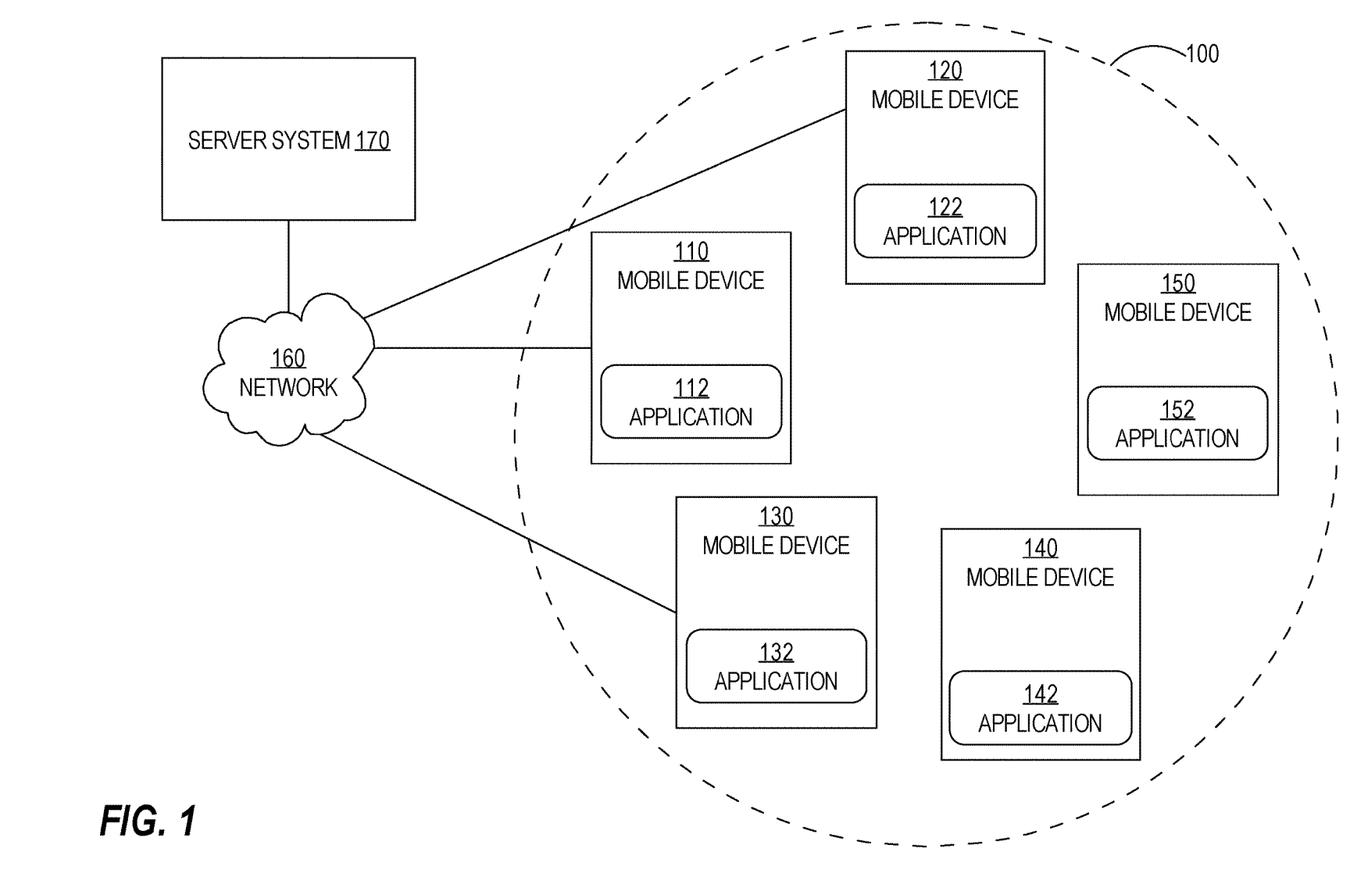
FIG. 1 is a block diagram that depicts an example mobile sharing environment, in an embodiment.

FIG. 1 is a block diagram that depicts a mobile sharing environment 100 for sharing data among multiple mobile devices 110-150, in an embodiment. Mobile sharing environment 100 corresponds to a geographic area, such as a meeting hall, a conference center, or a sports complex.

Each of mobile devices 110-150 is a computing device that is capable of establishing wireless connections directly with each other using one or more wireless connection technologies while in the mobile sharing environment. Examples of mobile devices include laptop computers, tablet computers, and smartphones. Examples of wireless connection technologies include Wi-Fi Direct and Bluetooth low energy (BLE).

Wi-Fi Direct, initially called Wi-Fi P2P, is a Wi-Fi standard that enables devices to easily connect with each other without requiring a wireless access point. Wi-Fi Direct has many uses, including Internet browsing and file transfer. Only one of the Wi-Fi devices needs to be compliant with Wi-Fi Direct in order to establish a peer-to-peer wireless connection that transfers data directly between the two devices with greatly reduced setup.

BLE is a wireless personal area network technology. Compared to "normal" or classic Bluetooth, BLE is intended to provide considerably reduced power consumption and cost while maintaining a similar communication range. One advantage of BLE is the ability to connect devices even if the devices are from different manufacturers.

Different mobile devices may implement different wireless connection technologies. For example, mobile device 110 may implement Wi-Fi Direct, mobile device 120 may implement BLE, and mobile device 130 may implement both Wi-Fi Direct and BLE.

Also, different mobile devices include different types of operating systems. For example, mobile device 110 includes a version of the Android operating system (developed by Google) while mobile device 130 includes a version of the iOS operating system (developed by Apple). A mobile device that includes a version of the Android operating system is referred to herein as an "Android device" and a mobile that includes a version of the iOS operating system is referred to herein as an "iOS device." At least one version of the iOS operating system provides the Multipeer Framework, which provides support for discovering services provided by nearby iOS devices using infrastructure Wi-Fi networks, Wi-Fi Direct, and Bluetooth personal area networks and subsequently communicating with those services by sending message-based data, streaming data, and resources (such as files).

Each mobile device also includes an application that interacts with the operating system of the device in order to establish a connection with another mobile device and send and receive data from the other mobile device. For example, mobile device 110 executes application 112, mobile device 120 executes application 122, and so forth.

Server System

In addition to mobile devices 110-150, FIG. 1 depicts a network 160 and a server system 170. Although depicted as a single element, server system 170 may comprise multiple computing elements and devices, connected in a local network or distributed regionally or globally across many networks, such as the Internet.

Each of mobile devices 110-150 (initiated by their respective applications) communicates with server system 170 over network 160. Network 160 may be implemented on any medium or mechanism that provides for the exchange of data between mobile devices 110-150 and server system 170. Examples of network 160 include, without limitation, a network such as a Local Area Network (LAN), Wide Area Network (WAN), Ethernet or the Internet, or one or more terrestrial, satellite or wireless links, such as a cellular network. While FIG. 1 depicts only mobile devices 110-130 as communicatively coupled to network 160, mobile devices 140-150 may also be communicatively coupled to network 160.

In a social networking context, server system 170 is provided by a social network provider, such as LinkedIn, Facebook, or Google+. In this context, server system 170 includes an account database that comprises information about multiple accounts. Each account includes a user profile that includes data provided by a different user. A user's profile may include a first name, last name, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user, and derived data that is based on actions that the candidate has taken. Examples of such actions include jobs to which the user has applied, views of job postings, views of company pages, private messages between the user and other users in the user's social network, and public messages that the user posted and that are visible to users outside of the user's social network (but that are registered users/members of the social network provider).

Some data within a user's profile (e.g., work history) may be provided by the user while other data within the user's profile (e.g., skills and endorsement) may be provided by a third party, such as a "friend," connection, colleague of the user.

Server system 170 may prompt users to provide profile information in one of a number of ways. For example, server system 170 may have provided a web page with a text field for one or more of the above-referenced types of information. In response to receiving profile information from a user's device, server system 170 stores the information in an account that is associated with the user and that is associated with credential data that is used to authenticate the user to server system 170 when the user attempts to log into server system 170 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

Continuing with the social network context, server system 170 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by server system 170 (or another automatic process). For example, a user specifies, in his/her profile, a name of the user's employer. Server system 170 determines, based on the name, where the employer and/or user is located. If the employer has multiple offices, then a location of the user may be inferred based on an IP address associated with the user when the user registered with a social network service (e.g., provided by server system 130) and/or when the user last logged onto the social network service.

While many examples herein are in the context of social networking, embodiments are not so limited.

Example Process

Figure 2:
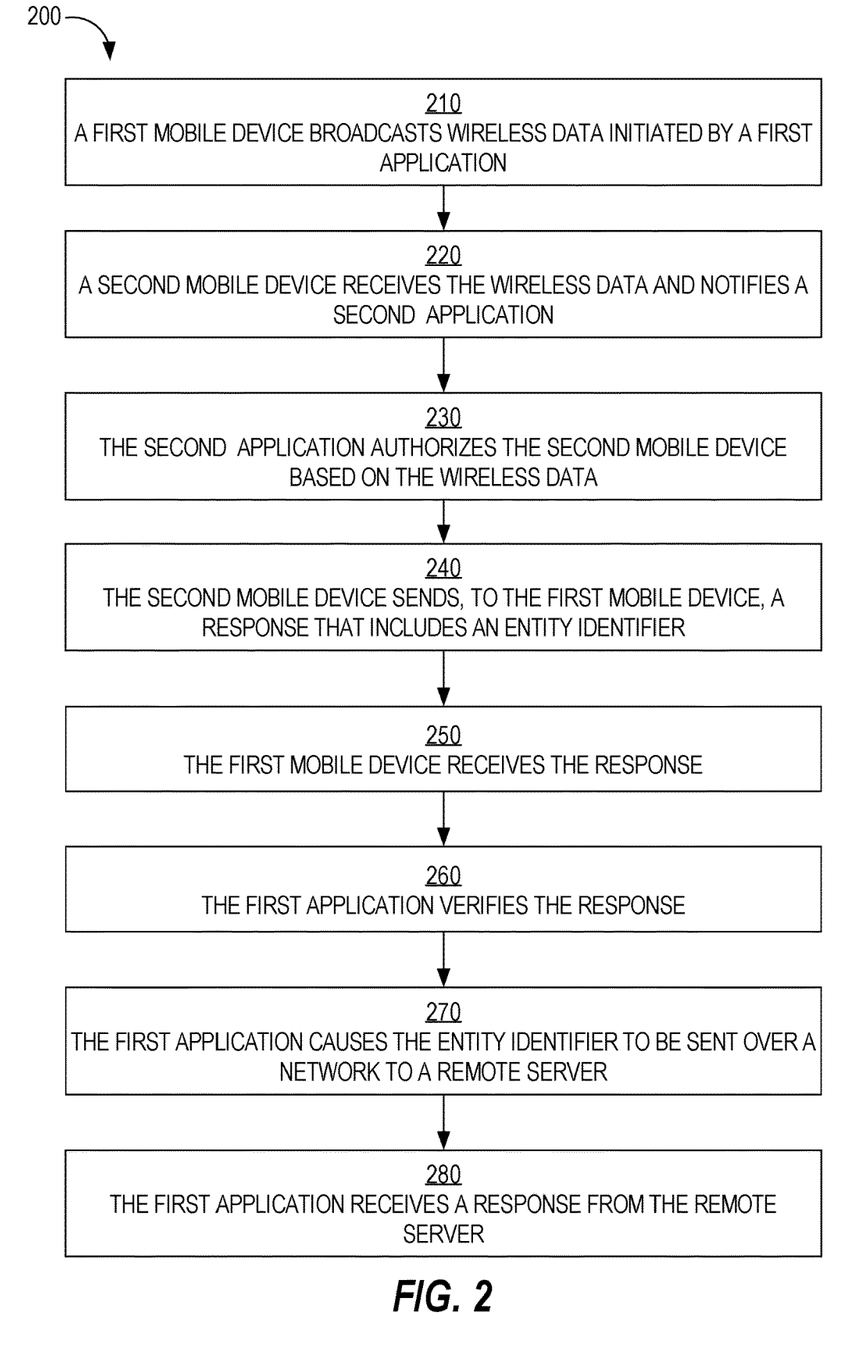
FIG. 2 is a flow diagram that depicts a process for sharing data with other devices in a mobile environment, in an embodiment.

FIG. 2 is a flow diagram that depicts a process 200 for sharing data with other devices in a mobile environment, in an embodiment. Process 200 is described in the context of the elements of FIG. 1.

At block 210, mobile device 110 broadcasts wireless data using a connection technology, such as BLE or Wifi Direct. Block 210 involves application 112 interacting with an operating system of mobile device 110 to initiate the broadcast. Application 112 may be configured to cause mobile device 110 to transmit wireless data every 15 seconds or every minute in order to discover other mobile devices in the immediate vicinity.

The wireless data may include an identifier, such as an application identifier that uniquely identifies an application or service. An example of an identifier is a UUID (or universally unique identifier), which is a 128-bit value. The word "unique" may mean "practically unique" rather than "guaranteed unique" since the identifiers have a finite size and it is possible that two different items share the same identifier, although unlikely. If another mobile device recognizes the identifier contained in the broadcasted wireless data, then the other mobile device may respond with its own identifier and, optionally, additional data. The identifier may have been established by an entity (or party) that provides the application, such as a social network provider.

In an embodiment, application 112 provides the ability for a user of mobile device 110 to switch such wireless transmission on and off. For example, application 112 may provide a "Discover Me" button or setting that, when selected, causes mobile device 110 to transmit the wireless data, and when deselected, prevents mobile device 110 from transmitting the wireless data. In this way, the user can control when s/he is willing to be discovered (or willing to have an affiliated entity discovered) by other users. In a related embodiment, application 112 includes a default setting that prevents application 112 from causing mobile device 110 to transmit the wireless data. In this embodiment, a user of mobile device 110 must provide affirmative input to application 112 before application 112 causes mobile device 110 to transmit the wireless data.

Block 210 includes one or more applications (including application 122) on other mobile devices "listening" for data using the connection technology (such as Wi-Fi Direct or BLE) used by mobile device 110 to transmit the wireless data. "Listening" may involve application 122 registering with an operating system of mobile device 120 to be notified about wireless data received using the same connection technology.

At block 220, mobile device 120 receives the broadcasted wireless data and notifies application 122.

At block 230, application 122 authorizes the second mobile device by analyzing at least a portion of the wireless data (or, to be more precise, a non-wireless version of the wireless data). Block 230 may involve determining whether a portion of the wireless data matches expected data, such as an application identifier or a unique token that is generated on-demand. Application 122 expects wireless data transmitted by a corresponding application (such as application 112) to be in a certain format and, based on that format, (1) analyzes the wireless data for certain data (e.g., bytes 5-39 of the broadcast data), (2) extracts that data, and (3) compares the extracted data with expected data, such as a stored UUID. If there is a match, then application 122 can trust mobile device 110 and process 200 proceeds to block 240.

The received wireless data may also include additional information, such as a device identifier that uniquely identifies mobile device 110 (or the device that transmitted the wireless data), such as a MAC address or a 32-bit IP address. The additional information may include a unique token generated for the purpose of this transaction or "handshake" process. In one scenario, a user might have two or more mobile devices, each of which is attempting to connect with another mobile device. With the additional information (such as a device ID), the other mobile device is able to determine that the same user is attempting to connect with the multiple mobile devices. For example, application 122 can distinguish between receiving the same entity identifier from (1) the same mobile device through two different channels (e.g., BLE and Multipeer Framework) and (2) two different mobile devices regardless of the channel used.

At block 240, mobile device 120 sends, to mobile device 110, a response that includes an entity identifier that identifies a particular entity, such as a company or an individual whose profile is maintained by server system 170. The response is directed to mobile device 110, which may be identified in the previously-received wireless data with a device identifier. The entity identifier may be recognizable or meaningful only to server system 170, which may have generated the entity identifier originally. The entity data may also be associated with a time-to-live (TTL) setting, such that the entity identifier is no longer recognizable to server system 170 after a certain period of time, such as a minute or an hour. Block 240 may involve application 122 sending an instruction and the entity identifier to an operating system of mobile device 120, which, in turn, generates the response and causes the response to be sent to mobile device 110.

In an embodiment, the entity identifier that is sent between mobile devices is an encrypted form of an entity identifier that is established by server system 170 at, for example, registration of the entity with the party (e.g., a social network provider) that provides server system 170. An application executing on a mobile device either has access to the encrypted version of an entity identifier (and not the unencrypted version) or encrypts the entity identifier prior to sending the encrypted entity identifier to another mobile device. If the latter, then the application may use a public key to encrypt the entity identifier and a server (e.g., server system 170) uses a private key to decrypt the encrypted entity identifier. Alternatively, the application generates (or assigns) a limited use token that acts as a temporary identifier. The token may be generated/assigned when a user of the application initiates a location-sharing session and is used exclusively for identifying the corresponding user or device for that purpose. Whether the encrypted approach or the token approach, a user of the application is unable to view plaintext (or unencrypted) versions of other user's entity identifiers. Hereafter, reference to "entity identifier" also includes an encrypted version thereof or a token that is used in place thereof.

Process 200 may be performed without requiring any user input, either at mobile device 110 or at mobile device 120. In this way, mobile devices 110-150 may discover each other and transmit substantive information to each other without any user input, much less prompting for user input.

In contrast, many connection technologies require user input in order to establish a wireless connection and transmit information, since such technologies assume that the amount of data that is transmitted is potentially quite significant, such as streaming audio or video.

At block 250, mobile device 110 receives the response from mobile device 120. Block 250 also involves application 110 "listening" for data from other mobile devices using the same connection technology as in block 210.

At block 260, application 112 verifies the response, which may include an application identifier. Block 260 may involve determining whether the response includes an identifier that matches (or is the same as) expected data, which may have been included in a software package that, when processed by mobile device 120, resulted in installing application 122. If so, then application 112 can trust mobile device 120 and process 200 proceeds to block 270.

At block 270, application 112 identifies the entity identifier within the response and causes the entity identifier to be sent over network 160 to server system 170. The entity identifier is included in a request, which may be a HTTP GET request that includes a URL or IP address associated with server system 170.

At block 280, application 112 receives, as a response from server system 170, entity data that includes information about an entity identified by the entity identifier. If the entity identifier identifies an individual, then the entity data may include data from a user profile of the individual, such as a first name, last name, whether the individual is connected to the user of mobile device 110 in a social network, and, if not, the fewest number of connections between the individual and the user (e.g., two, where a single connection between two people means that the two people are directly connected in the social network). If the entity identifier identifies an organization (e.g., a company or education institution), then the entity data may include data from an organization profile, such as an organization name, an organization address, one or more principals of the organization, and contact information, such as a phone number, email address, and/or web domain name.

Process 200 allows mobile devices to quickly discover each other, share data, and retrieve additional data without requiring user input and, optionally, using connection technologies that require little power, such as BLE. Because relatively few bytes are transmitted (e.g., an application identifier and an entity identifier), the likelihood that an established connection will be lost before all the necessary bytes are transmitted is very low. Thereafter, a significant amount of data may be requested from a remote server (based on the entity identifier) using a more robust or stable wireless connection technology, such as traditional (or "infrastructure) Wi-Fi or a cellular network.

In a related embodiment, instead of mobile device 110 including an identifier (e.g., an application identifier) in the wireless data broadcasted in block 210, mobile device 110 waits to transmit the identifier until mobile device 110 receives, from mobile device 120, certain data to verify. In this embodiment, the response received at mobile device 110 from mobile device 120 at block 250 may not include an entity identifier, but other verifiable data, such as an application identifier. Once mobile device 110 verifies the response, then mobile device 110 transmits an entity identifier to mobile device 120 and mobile device 120 responds with an entity identifier of its own.

In a related embodiment, initial wireless data (i.e., before a connection is made) that is transmitted includes an entity identifier and another identifier (e.g., an application identifier). In this way, a mobile device that receives such wireless data may verify the transmitting device and, in parallel, request entity data from server system 170 using the entity identifier. Therefore, the amount of messages that are required to be transmitted in order to retrieve data about a person or other entity may be significantly reduced.

Mesh Network

Some mobile devices may have limited peer-to-peer communication abilities. For example, some peer-to-peer communication technologies may not be as robust as other peer-to-peer communication technologies. Some connection strengths may be low, preventing connections from being established or preventing data transfer after connections are established. Therefore, in an embodiment, a first mobile device (that uses relatively robust connection technologies) collects data from one or more mobile devices (that may not have as robust connection technologies) and share that data with a second mobile device so that the second mobile device does not have to connect to any of the one or more other mobile devices in order to discover users of those mobile device(s).

Figure 3:
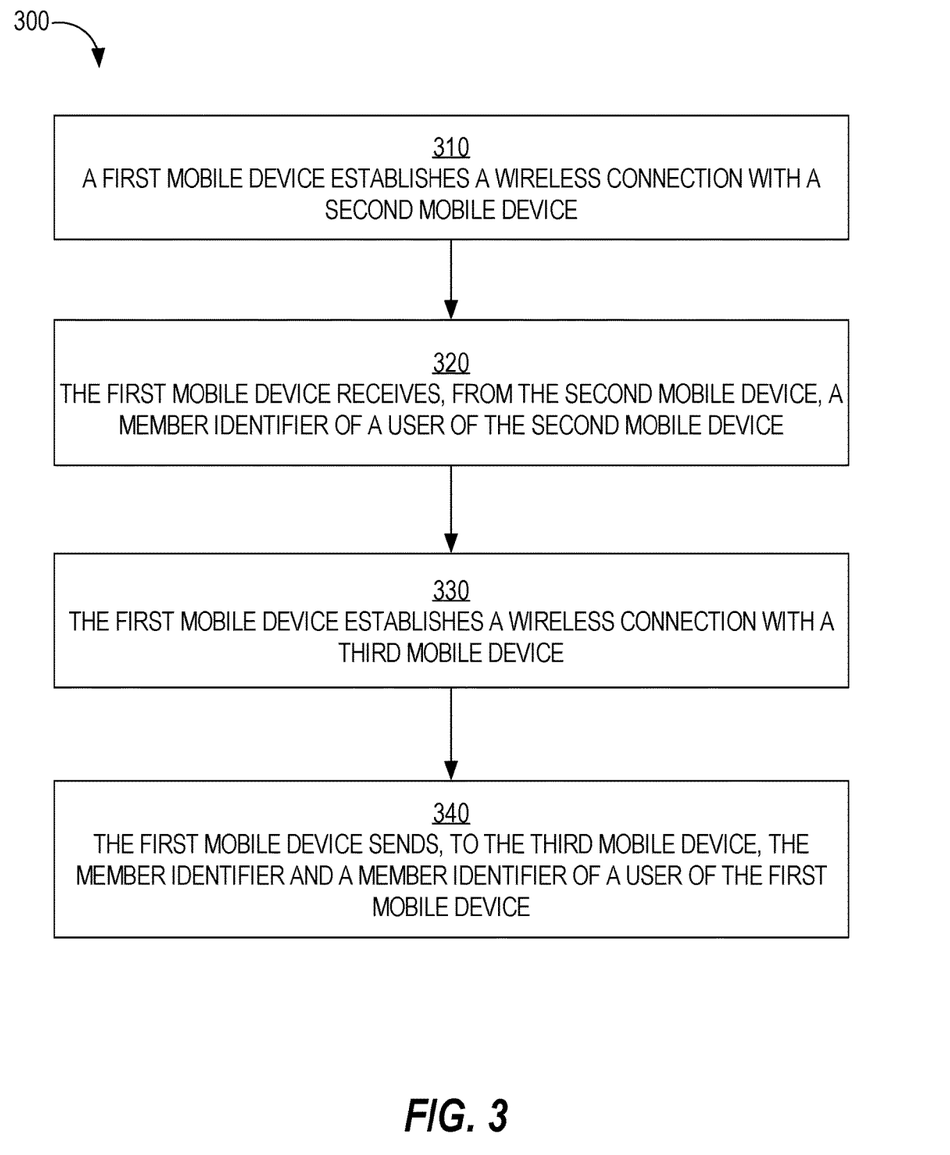
FIG. 3 is a flow diagram that depicts a process for sharing data among mobile devices, in an embodiment.

FIG. 3 is a flow diagram that depicts a process 300 for sharing data among mobile devices, in an embodiment. Process 300 is described in the context of the elements of FIG. 1.

At block 310, mobile device 110 establishes a wireless connection with mobile device 120. Block 310 may involve a portion of process 200, such as blocks 210-230 or blocks 210-260.

At block 320, mobile device 110 receives, from mobile device 120, a second entity identifier that identifies (or is otherwise associated with) a user of mobile device 120. Block 320 may be considered part of block 310. Block 320 may also involve mobile device 110 sending, to mobile device 120, a first entity identifier that identifies (or is otherwise associated with) a user of mobile device 110.

At block 330, mobile device 110 then establishes a wireless connection with mobile device 130. Again, block 330 may involve a portion of process 200, such as blocks 210-230 or blocks 210-260, except with respect to mobile device 130.

At block 340, mobile device 110 sends, to mobile device 130, the second entity identifier and the first entity identifier.

Thus, mobile device 130 receives, from mobile device 110, data that mobile device 110 received from mobile device 120. In this way, mobile device 130 does not have to wait to establish a wireless connection with mobile device 120, which connection might not be as robust as (1) the wireless connection between mobile device 110 and mobile device 120 and (2) the wireless connection between mobile device 110 and mobile device 130.

As a similar example, mobile device 110 establishes wireless connections with mobile devices 120, 140, and 150, receives entity identifiers from those mobile devices, and sends the entity identifiers to mobile device 130 in a single message. Thus, mobile device 130 does not have to wait to connect to any of mobile devices 120, 140, and 150 in order to discover those devices. Instead, mobile device 130, upon receiving the entity identifiers from mobile device 110, may send the entity identifiers (e.g., in a single request) to server system 170 and receive, in response, profile information pertaining to each of the entity identifiers.

As a specific example, mobile devices 110 and 130 are iOS devices and mobile devices 120, 140, and 150 are Android devices. In this scenario, one iOS device transfers Android data (i.e., data received from Android devices) to another iOS device using Multipeer Connectivity (which may select one of multiple wireless connection technologies that is performing well at the moment), rather than wait for the Android devices to connect to the other iOS device using BLE (or another wireless connection technology). Thus, the speed at which data is transmitted to mobile device 130 increases.

In another specific example, mobile device 110 is an iOS device and mobile devices 120-150 are Android devices. In this scenario, one iOS device transfers Android data to another Android device using BLE, rather than depending on the Android devices to connect to each other serially using a less reliable wireless connection technology, such as Wi-Fi Direct. Thus, reliability of data transmission increases.

Timestamps

In an embodiment, an entity identifier in a message from a mobile device to another mobile device includes a timestamp. An application on the mobile device (e.g., application 112) stores the entity identifier in association with the timestamp. If the entity identifier was received previously, then the timestamp may be stored in association with the other timestamps associated with that entity identifier. The one or more timestamps of an entity identifier may be used in one of multiple ways.

In an embodiment, a timestamp associated with an entity identifier is used to determine how long one user (or mobile device) was in the vicinity with (or spatial proximate to) another user (or mobile device). For example, mobile device 110 periodically receives, from mobile device 120, an entity identifier and an associated timestamp. If application 112 determines that the entity identifier was not received within the last few minutes, then application 112 determines that mobile device 110 is no longer spatial proximate with respect to mobile device 120. Application 112 then compares (1) the oldest timestamp associated with the entity identifier received from mobile device 120 with (2) the most recent timestamp associated with the entity identifier received from mobile device 120. The difference between the two timestamps may be used as an estimate as an amount of time that the user of mobile device 110 was spatially proximate to the user of mobile device 120. If the estimated amount of time is longer than a particular threshold, then entity data (retrieved from server system 170 based on the entity identifier) may be displayed to a user of mobile device 110 upon request.

For example, at the end of a day at a conference where a user of mobile device 110 interacted with many people, the user provides input (e.g., voice commands or a selection of one or more graphical buttons) to application 112, where the input indicates that the user desires to view information about people that the user met in the last 24 hours. The input may specify a time range and/or date range. The estimated length of time that mobile device 120 (and other mobile devices) is within communication range of mobile device 110 is used as a proxy for a "meeting." Application 112 provides a display that includes information about, for example, a user of mobile device 120 and a user of mobile device 130, if those mobile devices were within communication range of mobile device 110 for a particular period of time. Thereafter, the user of mobile device 110 may select displayed information associated with a user of mobile device 120 to cause a message (e.g., an invitation to connect in a social network) to be sent to mobile device 120.

A similar example and result is if mobile device 110 receives an entity identifier and associated timestamps from mobile device 120 where the entity identifier is associated with a user of mobile device 130. Mobile device 110 may have a poor wireless connection with mobile device 130, but may have a stronger wireless connection with mobile device 120. Therefore, the first and last timestamps associated with the entity identifier may be used to estimate a total time that mobile device 130 is/was in spatial proximity with mobile device 120, which was in social proximity with mobile device 110.

In an embodiment, a timestamp associated with an entity identifier is used to determine whether to send the entity identifier to another mobile device. In one scenario, transmitting a set of entity identifiers (that a first mobile device received from other mobile devices) from the first mobile device to a second mobile device (as in FIG. 3) may result in a user of the second mobile device discovering entities (e.g., other users) that are not spatially proximate to the user. Application 112 may be designed with the purpose to inform a user of mobile device 110 about other users who are within a relatively close range. Therefore, if a difference between a current time and a timestamp of a particular entity identifier is greater than particular threshold, then application 112 determines not to cause the particular entity identifier to be transmitted to any other mobile device. Thus, there may be situations where a first mobile device receives a set of entity identifiers from a second mobile device and determines to send, based on the timestamps associated with the set of entity identifiers, a strict subset of the set of entity identifiers to a third mobile device.

Hop Count

In an embodiment, a hop count is associated with an entity identifier. A hop count indicates a number of times the corresponding entity identifier has been transmitted from one mobile device to another. A hop count may be used to make one or more decisions, such as determining whether to forward an entity identifier (received from one mobile device) to another mobile device.

For example, when mobile device 110 transmits, to mobile device 130, an entity identifier that identifies a user/entity of mobile device 110, the transmission includes a hop count that is associated with the entity identifier. The hop count may be initially 0, indicating that the entity identifier originates with the transmitter (i.e., mobile device 110 in this example) and not with any other "upstream" mobile device that communicates one or more entity identifiers to mobile device 110. Upon receiving an entity identifier, mobile device 110 increments a hop count associated with the entity identifier (e.g., from 0 to 1 or from 0 to 1). Thus, if mobile device 110 receives a particular entity identifier from mobile device 120 and the hop count associated with the particular entity identifier is 0, then application 112 increases the hop count to 1. Then, if mobile device 110 transmits the particular identifier to mobile device 130, then mobile device 110 also sends 1 as the hop count. Application 132, upon receiving the particular entity identifier and hop count, increases the hop count to 2.

In an embodiment, an application uses a hop count to determine whether to forward the corresponding entity identifier to another identifier. For example, application 112 determines whether a hop count is greater than a particular threshold (e.g., three) and, if so, determines not to forward the associated entity identifier to another mobile device to which application 112 connects. Such a threshold limits the extent to which a user may be discovered.

In an embodiment, an application uses a hop count to determine whether to retrieve, from server system 170, information about an entity identified by the corresponding entity identifier. A similar threshold (e.g., four) may be used to make the determination.

In an embodiment, an application (e.g., application 112) uses a hop count to determine whether to display entity data (retrieved from server system 170 based on the corresponding entity identifier). For example, if a hop count is greater than three, then the entity data of the corresponding entity identifier is not displayed.

In a related embodiment, an application allows a user to select a hop count as a filter in retrieving and/or displaying information about an entity identified by the corresponding entity identifier. Thus, for example, if a user-selected hop count is greater than a hop count associated with an entity identifier received at mobile device 110, then information about the corresponding entity is displayed on a screen of mobile device 110. Otherwise, the information is not displayed.

Triggering Discoveries

A process to discover, connect to, and share data (e.g., process 200) may be constantly running, either in the foreground or in the background. For example, mobile device 110 periodically transmits wireless data (e.g., every minute), waiting for a response from another mobile device. Application 112 may be designed to allow a user to select a setting that turns the constantly transmitting feature on and off.

Additionally or alternatively, the discovery process is triggered based on one or more criteria, which may be time-based, geography-based, or a combination of the two.

For example, application 112 determines that a current time matches a particular time or is within a particular time period. In response to the determination, application 112 initiates the discovery process. If only a particular time is established (as opposed to a time period), then the discovery process begins at the particular time and continues until explicit user input to turn the discovery process off (i.e., stop discovering other mobile devices and connecting to those mobile devices). Alternatively, a default setting or user setting may indicate an amount of time (e.g., one hour) to keep broadcasting wireless data in search for new mobile devices with which to connect. If a particular time period (e.g., thirty minutes) is established, then the discovery process automatically turns off when the time period has lapsed.

The particular time or time period may be established through a calendar system that may be integrated into the application that initiates the discovery process or may be implemented by a different software program. For example, application 112 has access to calendar data that indicates when one or more meetings are scheduled. The calendar data may be managed by application 112 or may be managed by another software component and accessible to application 112 through an application programming interface (API) or web interface associated with the other component.

For example, application 112 retrieves calendar data about a certain meeting and determines that, at the beginning of the meeting, the discovery process is initiated. The calendar data may include discovery data that indicates whether the discovery process is to be initiated during (or right before) the meeting. For example, a user provides input that indicates s/he desires to discover users in spatial proximity to the user during an event, which may be a business meeting, a tech conference, a roundtable discussion, a job fair, a class reunion, or a town hall meeting. Application 112 detects the discovery data that is based on the input and initiates the discovery process when the event begins.

Displaying Entity Data

In an embodiment, an application (e.g., application 112) causes entity data that it receives from server system 170 to be displayed on a screen of a mobile device (e.g., mobile device 110). If mobile device 110 retrieved entity data regarding multiple entities (e.g., people), then application 112 may cause all the entity data to be displayed on a screen of mobile device 110 concurrently or allow a user of mobile device 110 to scroll through the entity data of each entity, one by one.

The display of entity data may be performed as soon as the entity data is received. Alternatively, input from a user may be required to view data about entities that application 112 discovered. The input may be to view information about all entities for which entity data has been retrieved from server system 170. Additionally or alternatively, input may specify or indicate one or more criteria that are used determine which entity data to display. Example criteria include a time range (as described previously), a geographic region or a name of a place that is associated with a geographic region, and one or more attributes of an entity, such as companies with job openings, people with a certain job title or job function, people who are currently unemployed, or anything that may be found in a company profile or user profile reflected in the retrieved entity data.

For example, a user of mobile device 110 specifies a time range of 5 pm-6 pm on September 10 and application 112 determines, based on the stored timestamps, which entities were discovered during that date and time range. In this way, a user is allowed to view information about people that the user may have met previously at a meeting that occurred during the specified time range.

As another example, application 112 stores, in association with each entity identifier that it discovers, location data that indicates where mobile device 110 was located when the corresponding entity identifier was received (or when the corresponding entity data was retrieved). Later, a user of mobile device 110 specifies a name of a hotel and a city in which the hotel is located and, in response, application 112 determines a geographic location of the hotel and compares the geographic location to entity identifiers that are associated with the geographic location. In this way, the user may need to only recall where the user was when he met one or more people of significance in order to view information about those people.

As another example, a user of mobile device 110 specifies a job status, such as unemployed, and, in response, application 112 compares the specified job status with job statuses indicated in the entity data of each discovered entity. If there is a match, then the corresponding entity data is displayed on a screen of mobile device 112.

As noted previously, a user may specify multiple filter criteria that is used by application 112 to perform a local search on the entity data that application 112 retrieved from server system 170. Alternatively, application 112 may forward one or more filter criteria, entity identifiers, and, optionally, timestamps and hop counts to server system 170, which performs the search and the comparison and provides the results, over network 160, to application 112 for display on mobile device 110.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
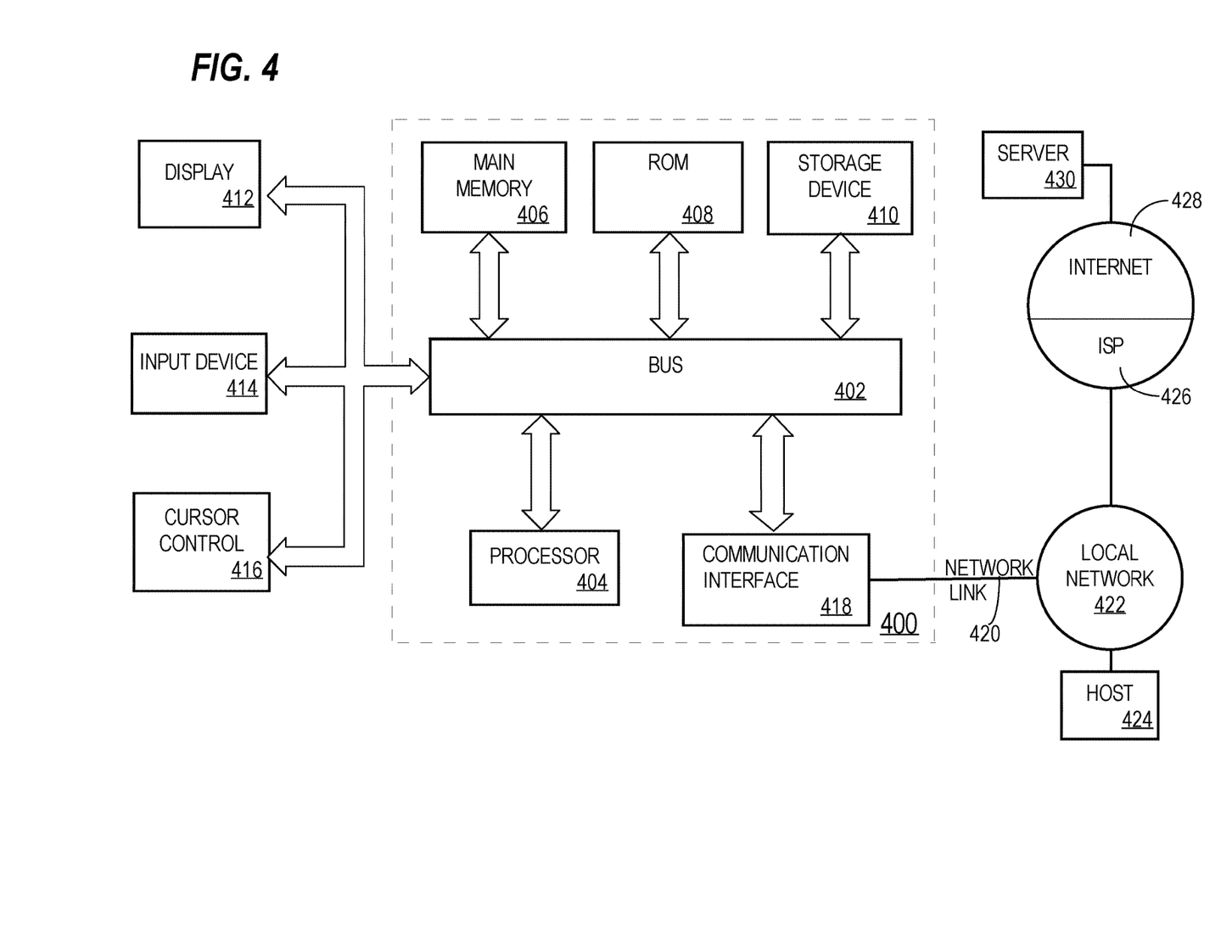
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method performed by a first computing device, the method comprising:
    storing, by the first computing device, first entity data that identifies a first user of the first computing device;
    establishing, by the first computing device, a first wireless connection with a second computing device;

receiving, by the first computing device, from the second computing device, through the first wireless connection, second entity data that identifies a second user of the second computing device;
  establishing, by the first computing device, a second wireless connection with a third computing device that is different than the second computing device;
  sending, by the first computing device, to the third computing device, through the second wireless connection, the first entity data and the second entity data;
  wherein the third computing device is not wirelessly connected to the second computing device when the third computing device receives the first entity data and second entity data from the first computing device.

2. The method of claim 1, wherein the first computing device and the third computing device include a first type of operating system and the second computing device includes a second type of operating system that is different than the first type of operating system.

3. The method of claim 2, wherein the first type of operating system is an iOS operating system and the second type of operating system is an Android operating system.

4. The method of claim 2, wherein:
  establishing the first wireless connection comprises establishing the first wireless connection using Bluetooth Low Energy (BLE);
  establishing the second wireless connection comprises establishing the second wireless connection using Multipeer Connectivity.

5. The method of claim 1, wherein:
  the first computing device includes a first type of operating system; and
  the third computing device and the second computing device include a second type of operating system that is different than the first type of operating system.

6. The method of claim 5, wherein the first type of operating system is an iOS operating system and the second type of operating system is an Android operating system.

7. The method of claim 5, wherein:
  establishing the first wireless connection comprises establishing the first wireless connection using Bluetooth Low Energy (BLE);
  establishing the second wireless connection comprises establishing the second wireless connection using Bluetooth Low Energy (BLE).

8. The method of claim 1, wherein:
  prior to receiving the second entity data, establishing the first wireless connection with the second computing device and receiving the second entity data without prompting user input.

9. The method of claim 1, further comprising:
  in response to receiving the second entity data, sending, over a network, to a remote server, a request that includes the second entity data;
  receiving, from the remote server, a response to the request, wherein the response includes information about a user that is associated with the second entity data.

10. The method of claim 9, further comprising:
  receiving, through the first wireless connection, a first timestamp that is associated with the second entity data;
  determining, based on the first timestamp, whether to send the request to the remote server;
  wherein sending the request comprises sending the request in response to determining to send the request based on the first timestamp.

11. The method of claim 1, further comprising:
  receiving, through the first wireless connection, a first timestamp that is associated with the second entity data;
  determining, based on the first timestamp, whether to send the second entity data to the third computing device through the second wireless connection.

12. A method performed by a first computing device, the method comprising:
  broadcasting wireless data;
  after broadcasting the wireless data, establishing, by the first computing device, a wireless connection with a second computing device;
  receiving, by the first computing device, from the second computing device, application data and first entity identification data that identifies a user of the second computing device;
  validating, by the first computing device, the second computing device based on the application data;
  in response to validating the second computing device based on the application data, sending, by the first computing device, to the second computing device, through the wireless connection, second entity identification data;
  establishing an Internet connection with a remote server system;
  in response to receiving the first entity identification data, sending, by the first computing device, the first entity identification data over a network to the remote server system using the Internet connection;
  after sending the first entity identification data to the remote server system, receiving, by the first computing device, from the remote server system, entity data that pertains to an entity that is identified by the first entity identification data.

13. The method of claim 12, wherein:
  the application data is an application identifier;
  authorizing the second computing device comprises determining whether the application identifier matches a stored application identifier;
  the second computing device is authorized if the application identifier matches the stored application identifier.

14. The method of claim 12, wherein:
  the first entity identification data identifies a first user of the second computing device;
  the second entity identification data identifies of a second user of the first computing device.

15. The method of claim 14, wherein:
  the entity data includes profile data of the first user;
  the profile data includes two or more in a group consisting of:
    a digital photo of the first user, a name of the first user, an indication of whether the first user is an existing connection of the second user in a social network of the first user, and a name of an organization with which the first user is affiliated.

16. The method of claim 14, wherein sending the second entity identification data comprises sending one or more entity identifiers of one or more other users of other computing devices, other than the second computing device, that the first computing device discovered.

17. The method of claim 14, wherein receiving the first entity identification data comprises receiving one or more entity identifiers of one or more other users of other computing devices, other than the first computing device, that the second computing device discovered.

18. The method of claim 12, wherein:
the first computing device includes a version of an iOS operating system;
the second computing device includes a version of an Android operating system;
establishing the wireless connection comprises establishing the wireless connection using Bluetooth Low Energy (BLE).

19. The method of claim 1, wherein:
the first entity data is based on first data that was established by a social network provider when the first user registered with the social network provider;
the second entity data is based on second data that was established by the social network provider when the second user registered with the social network provider.

20. The method of claim 12, wherein establishing the wireless connection and receiving the application data and the first entity identification data without any user input.

\* \* \* \* \*